United States Patent [19]

Wu

[11] Patent Number: 4,964,215
[45] Date of Patent: Oct. 23, 1990

[54] APPARATUS FOR CRACKING A MELON SEED

[76] Inventor: Hans Wu, No. 138, Hsia-Lin Road, Tainan, Taiwan

[21] Appl. No.: 361,214

[22] Filed: Jun. 5, 1989

[51] Int. Cl.⁵ .............................................. A47J 43/26
[52] U.S. Cl. .................................. 30/120.1; 30/120.3
[58] Field of Search ................. 30/120.1, 120.2, 120.3, 30/120.4, 120.5; 99/568, 578, 582

[56] References Cited

U.S. PATENT DOCUMENTS

| | | | |
|---|---|---|---|
| 698,734 | 4/1902 | Quackenbush | 30/120.4 |
| 2,378,084 | 6/1945 | Jackson | 30/120.3 |
| 4,397,087 | 8/1983 | Burrage | 30/120.3 |

FOREIGN PATENT DOCUMENTS 1062897  4/1954  France ............................ 30/120.4

Primary Examiner—Frank T. Yost
Assistant Examiner—Rinaldi Rada
Attorney, Agent, or Firm—Ladas & Parry

[57] ABSTRACT

An apparatus for cracking the hull of a melon seed. The apparatus includes a flat plate and a pair of cracking members pivoted to the flat plate. A protrusion projects from the surface at which the cracking members are located. The cracking members have two clamping edges which face each other and are adapted to clamp the tapered end of the melon seed to be cracked while the round end of the melon seed abuts the protrusion by moving the cracking members toward each other. The apparatus is provided with two spring members for urging the cracking members to move away from each other to a position at which the melon seed may be released.

2 Claims, 6 Drawing Sheets

APPARATUS FOR CRACKING A MELON SEED

BACKGROUND OF THE INVENTION

This invention relates to a hull-cracking apparatus, and more particularly to an apparatus for cracking the hull of melon seeds.

Melon seeds, such as watermelon seeds, sunflower seeds, pumpkin seeds and the like, are the favorite snack of many people. A person wishing to eat the meat inside the hull of a melon seed usually cracks said hull by means of his or her teeth. However, due to the possible unsanitary condition of the seed hulls, it may not be healthy for a person to crack said hulls by means of his or her teeth. In addition, it is not appropriate for some persons to use their teeth to crack melon seeds because of possible damage to dental work or a lack of healthy teeth.

SUMMARY OF THE INVENTION

It is therefore a main object of this invention to provide an apparatus for cracking the hull of melon seeds and other flat seeds such as sunflower seeds which can be operated by hand.

Accordingly, the apparatus for cracking the hull of melon seeds of the present invention includes a flat plate having a protrusion projecting therefrom for positioning the round end of said melon seed. A pair of cracking members each has a head portion pivoted to the flat plate near the protrusion and a handle portion extended from said head portion. Each of the head portions has a clamping edge facing the other one of the head portion to clamp the tapered end of the melon seed. The handle portions are positioned near the protrusion of both sides thereof. The apparatus is provided with a spring means for urging the handle portions to move away from each other and for urging the head portions to a position at which the melon seed may be released. The melon seed or other flat seeds can be cracked when the handle portions are moved toward each other by squeezing by the user's hand.

BRIEF DESCRIPTION OF THE DRAWINGS

Other features and advantages of this invention will become apparent in the following detailed description of the preferred embodiments of this invention with reference to the accompanying drawings, in which:

FIG. 1 is an exploded view of a preferred embodiment of the invention for.

DETAILED DESCRIPTION OF THE PREFERRED EMBODIMENTS

Figure 1:
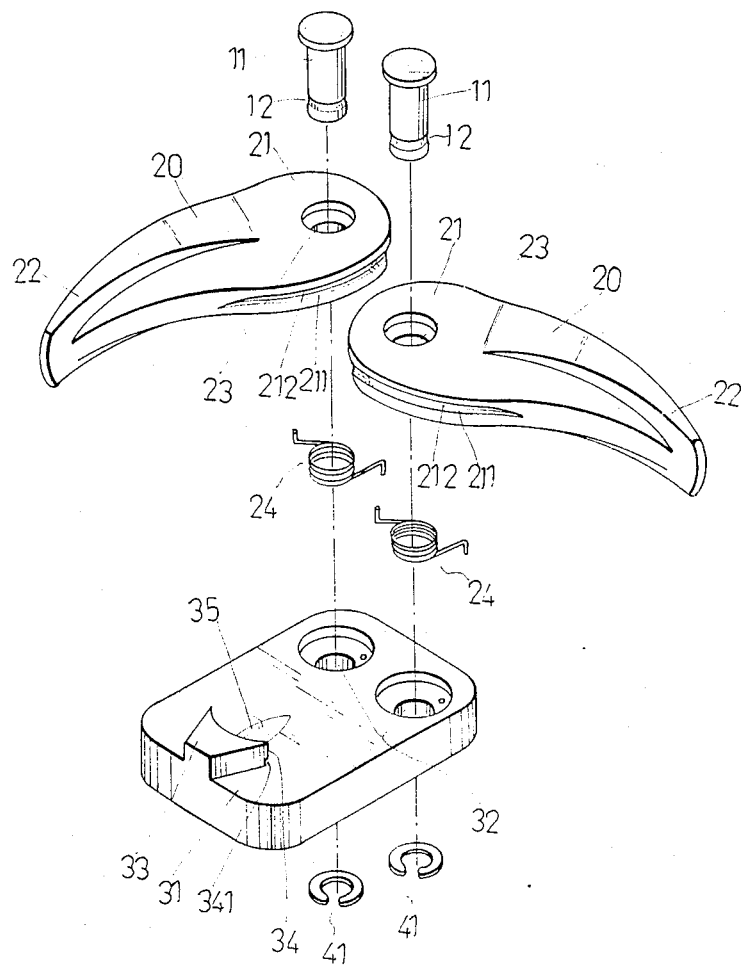
Figure 3:
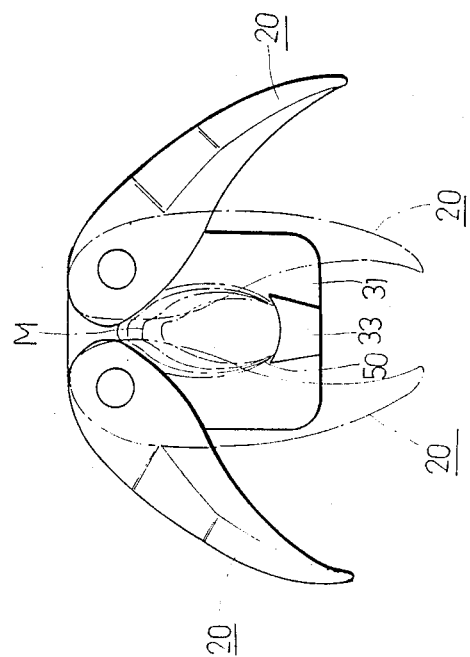
FIG. 3 is a schematic view showing the apparatus of FIG. 2 in an operative position.
Figure 2:
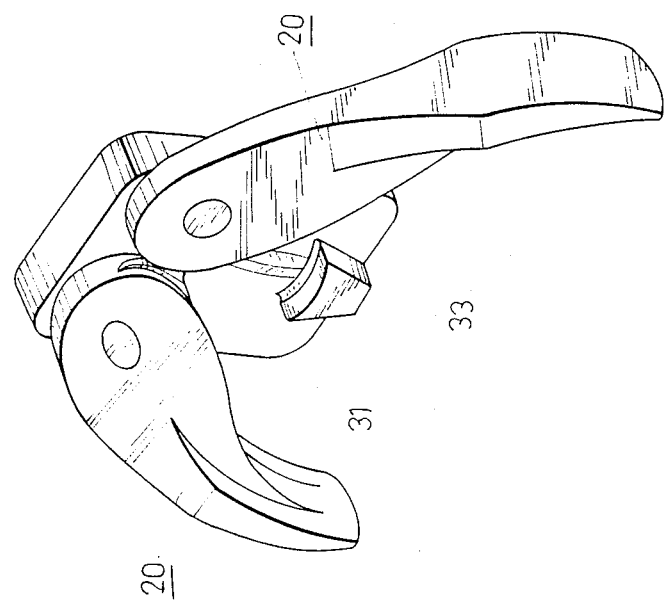
FIG. 2 is an elevated side the view of the preferred embodiment of the invention shown in FIG. 1.
Figure 7:
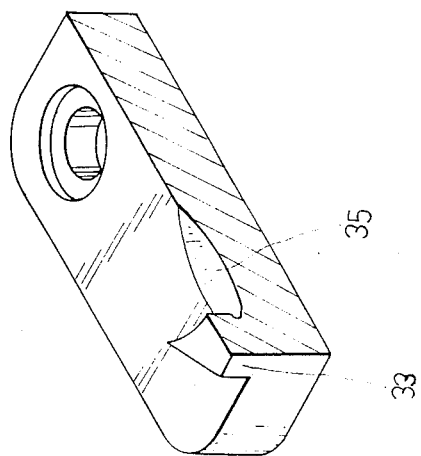
FIG. 7 is a sectional view of a concavity of the flat plate of the apparatus.
Figure 6:
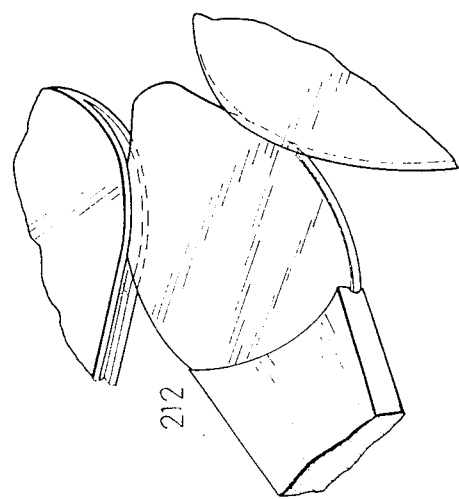
FIG. 6 is an elevated side view showing the tapered end of a melon seed being clamped by the cracking members of the apparatus.

FIGS. 1 and 2, are an exploded view and an elevated side view of one preferred embodiment of the invention. The apparatus has a rectangular flat plate 31, a pair of cracking members 20, 20, and two return springs 24, 24. The flat plate 31 has a protrusion 33 projecting therefrom. The protrusion 33 has an arcuate abutting face 34 in which a positioning notch 341 is formed for positioning the round end of a melon seed. A concavity 35 is formed in the plate near the abutting surface 34 of the protrusion, as shown in FIG. 7 for positioning a melon seed, such as a sunflower seed, which has convex surfaces formed on the two sides thereof. Each of the cracking members 20 has a head portion 21 pivotally connected by a pivot pin 11 near the protrusion 33, and a handle portion 22 extended from said head portion 21. The pivot pin 11 passes through a through hole 23 formed in said head portion 21, the return spring 24 and the hole of the flat plate 31 from the upper side of said flat plate 31 to the lower side of the same with the lower end of said pivot pin 12 being clamped by a restraining ring 41. The return spring 24 is connected with the head portion 21 of the cracking member 20 at one end thereof and connected with the flat plate 31 at the other end thereof. Thereby, the head portions 21, 21 of the cracking members 20, 20 will be urged to move away from each other to a position at which the melon seed to be cracked is released, and the handle portions 22, 22 will extend away from the protrusion 33 at either side thereof. Each head portion 21 of the cracking member 20 has a clamping edge 211 facing the other of the head portions 21 so as to clamp the tapered end of a melon seed when said melon seed is positioned on the flat plate 31 with the round end 50 thereof abutting with the abutting face 34 of the protrusion 33. In this way, as illustrated in FIG. 3 the hull of a melon seed M can be cracked when the user grasps the handle portions 22, 22 of the cracking members 20, 20 and enables the head portions 21, 21 to move toward each other thus clamping the tapered end of said melon seed M. Each of the clamping edges 211, 211 of the cracking members 20, 20 is preferably provided with a long groove 212 for positioning the tapered end of the melon seed to be cracked, as best illustrated in FIG. 6.

Figure 4:
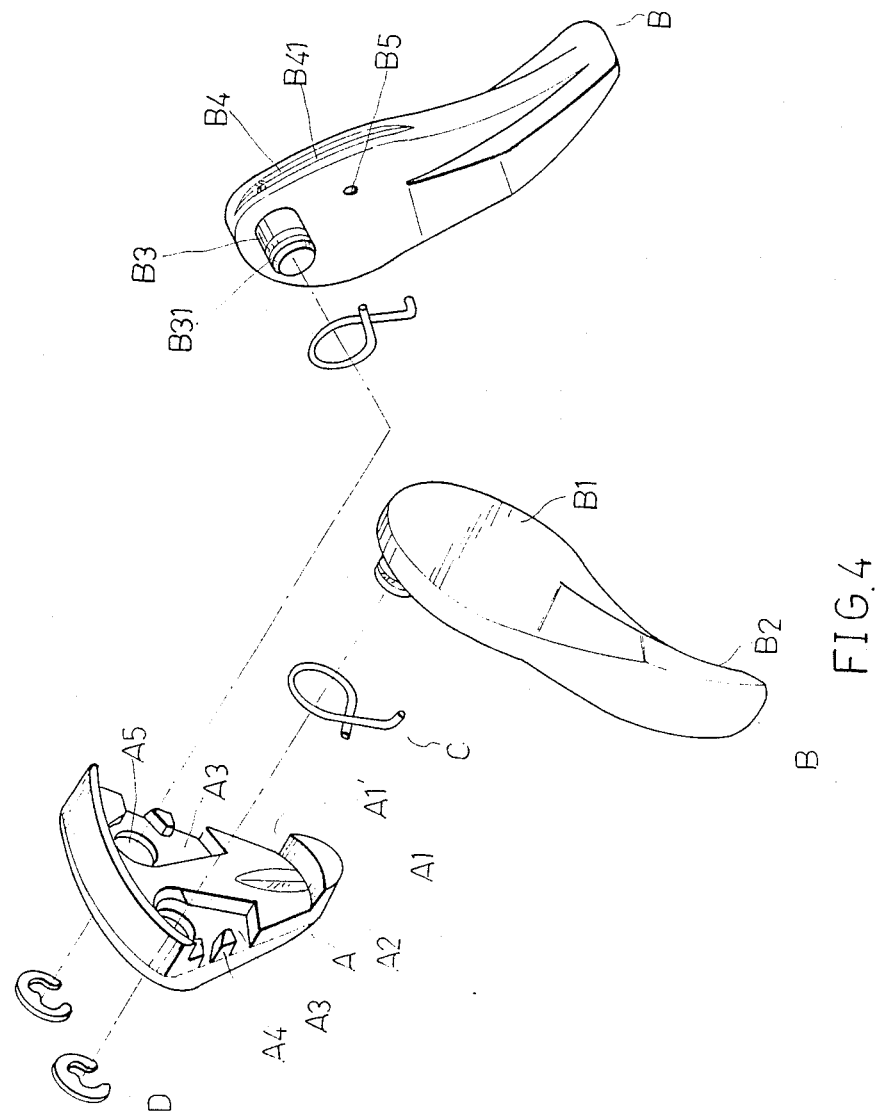
FIG. 4 is an exploded view of another preferred embodiment of the invention.
Figure 5:
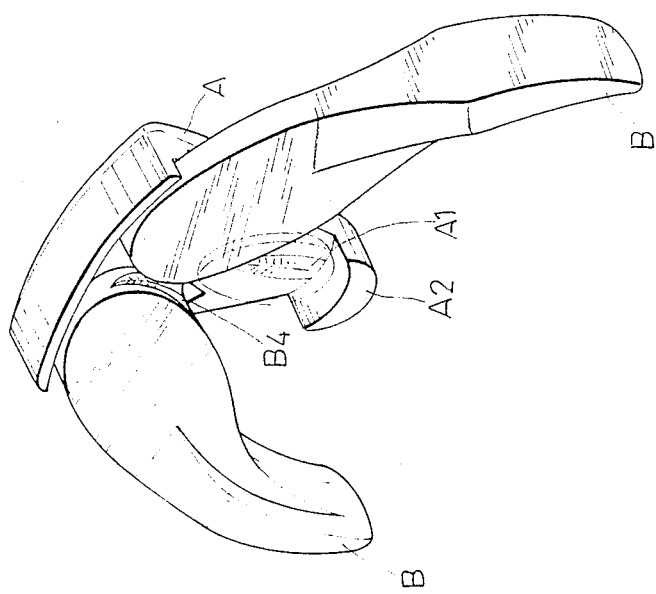
FIG. 5 is an elevated side view of the preferred embodiment the invention shown in FIG. 4.

FIGS. 4 and 5 are an exploded view and an elevated side view of another preferred embodiment of the invention. In the illustrated embodiment, the apparatus has a triangular flat plate A and a pair of cracking members B, B. The flat plate has a protrusion A1 projecting from the apex portion thereof with an arcuate abutting face A1'. The flat plate also has a concavity A1 formed near the protrusion A2 which is similar to the concavity 35 shown in FIG. 1. Each of the cracking members B, B has a head portion B1 and a handle portion B2 extended from said head portion B1. Each of the head portions B2 has a stub shaft B3 extended from the bottom side thereof. The stub shaft B3 passes through a through hole A5 formed in the flat plate A, the lower end of said stub shaft B31 being clamped by a restraining ring D. Thereby, the cracking members B, B can be pivotable mounted to the flat plate A. Two spring members C are respectively mounted in two concave portions A3 formed in the upper surface of the flat plate A which are adjacent to the through holes A5. Each of the spring members C has one end which fitted into a positioning hole B5 formed in each head portion B1 and another end which is engaged with a protrusion A4 projecting from the concave portion A3 of the flat plate A. Thereby, the head portions B1, B1 will be urged in a manner as described in previous embodiment. Each of the head portions B1 of the cracking members B has a clamping edge B4 in which a long groove B41 is formed so as to clamp and position the tapered end of the melon seed to be cracked. Therefore, a melon seed can be cracked by the illustrated embodiment in a manner as described hereinbefore.

Figure 8:
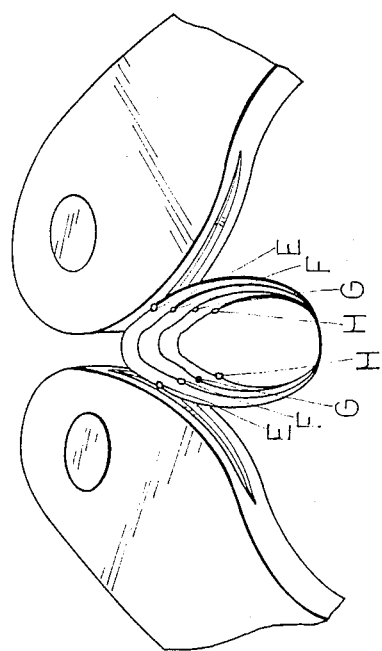
FIG. 8 is a schematic view showing the contact points between the cracking members and melon seeds of different sizes.

In accordance with the both embodiments of present invention, the apparatus may be used to crack seeds such as black melon seeds, white melon seeds and sunflower seeds. Furthermore, the apparatus can be used with melon seeds of different sizes. The preferred contact points between clamping edges B4 of the head portions B1 are illustrated in FIG. 8 as points E, F, G and H. After the operator grasps the handle portions of the cracking members and enables the clamping edges of the head portions to clamp the tapered end of a melon seed for the purpose of cracking said melon seed, he or she can easily separate the meat of said melon seed from the hull of said melon seed by means of his or her fingers. In this respect, it is not necessary for a person to crack a melon seed by means of his or her teeth.

With this invention thus explained, it is apparent that numerous modifications and variations can be made without departing from the scope and spirit of this invention. It is therefore intended that this invention be limited only as indicated in the appended claims.

I claim:

1. An apparatus for cracking the hull of a melon seed having a round end and a tapered end, said apparatus comprising:
    a flat plate having a protrusion projecting therefrom for positioning said round end of said melon seed and having a concavity means formed therein near said protrusion for receiving said melon seed;
    a pair of cracking members each having a head portion pivoted to said flat plate near said protrusion and a handle portion extended from said head portion, each of said head portions having a clamping edge facing the other one of said head portions to clamp said tapered end of said melon seed, said clamping edge provided with a long groove for positioning said melon seed, and said handle portions positioned near said protrusion at either side thereof;
    a spring means for urging said handle portions to move away from each other and urging said head portions to a position at which said melon seed may be released; whereby said melon seed can be cracked when said handle portions are moved toward each other.

2. An apparatus as claimed in claim 1, wherein said protrusion has an arcuate abutting face adapted to abut with the round end of a melon seed.

* * * * *